United States Patent [19]

Beck et al.

[11] Patent Number: 4,817,779

[45] Date of Patent: Apr. 4, 1989

[54] SELECTIVE PRODUCT FEED APPARATUS

[75] Inventors: Charles C. Beck, Bloomington; Gregory S. Anderson, Eagan, both of Minn.

[73] Assignee: Thiele Engineering Company, Minneapolis, Minn.

[21] Appl. No.: 857,713

[22] Filed: Apr. 30, 1986

[51] Int. Cl.$^4$ .............................................. B65G 47/46
[52] U.S. Cl. .................................. 198/365; 198/372; 198/457; 198/477.1; 53/252
[58] Field of Search ..................... 198/365, 477.1, 457, 198/802, 372; 53/251, 252

[56] References Cited

U.S. PATENT DOCUMENTS

| | | | |
|---|---|---|---|
| 3,735,867 | 5/1973 | Vanderhoof et al. | 198/365 X |
| 3,770,100 | 11/1973 | McCaul | 198/365 X |
| 3,786,910 | 1/1974 | Wallis | 198/365 |
| 3,906,705 | 9/1975 | Beck et al. | 53/252 |
| 4,223,777 | 9/1980 | Aykut | 198/365 |
| 4,553,659 | 11/1985 | Reim et al. | 53/252 X |

*Primary Examiner*—Andrew V. Kundrat
*Assistant Examiner*—Peter M. Cuomo
*Attorney, Agent, or Firm*—Fitch, Even, Tabin & Flannery

[57] ABSTRACT

A device for use in packaging apparatus in which an article is carried on a first conveyor and is transferred to a second conveyor during continuous motion of the conveyors. A transfer mechanism including a cam follower is engageable by a cam track underlying the first conveyor to actuate the transfer mechanism for effecting the transfer operation. A selective direction or bypass device engages the cam follower to guide it to either engagement with the cam track to either effect a transfer operation or to bypass the cam track so that the transfer operation is not effected. The bypass device includes a guide track that engages the cam follower that is mounted on a pivot pin on a frame member of the first conveyor adjacent to the upstream ends of the first conveyor and the cam track. The guide track is movable laterally with respect to the cam track and has a quarter circular profile so as to engage the cam follower as the cam follower travels about the conveyor sprocket. The guide track is automatically pivoted in response to a sensed condition on the first and second conveyor by a pneumatic cylinder operatively connected to the guide track.

6 Claims, 3 Drawing Sheets

FIG. 4
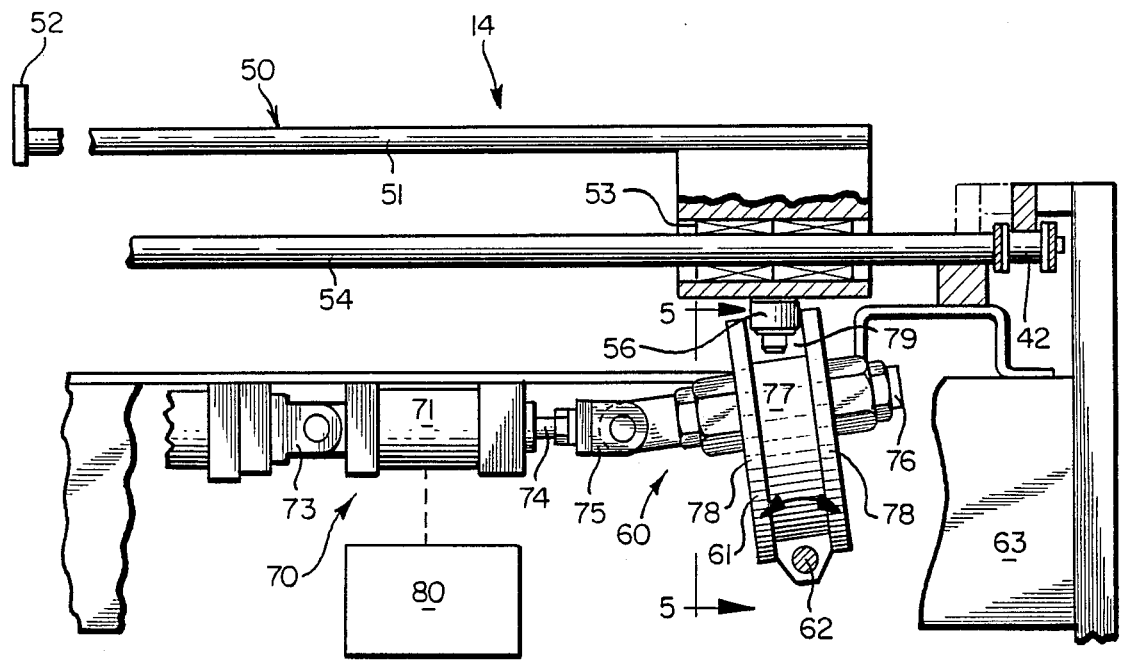
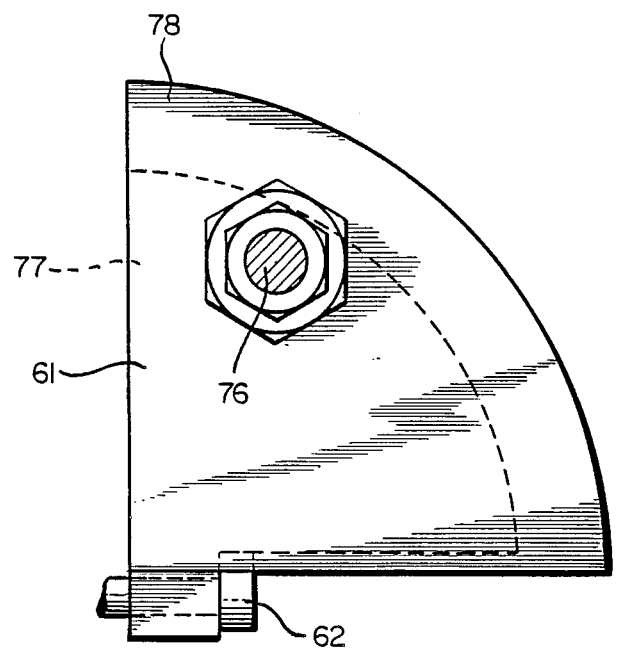
FIG. 5

SELECTIVE PRODUCT FEED APPARATUS

The present invention relates generally to an apparatus for selectively loading articles into a carton while the carton is being continuously conveyed and, more particularly, to a switching mechanism that causes product-loading means to bypass the product loading section of the conveyor apparatus.

Various apparatus are known for inserting products into moving cartons. See, e.g., U.S. Pat. No. 3,906,705, which is herein incorporated by reference. Such apparatus typically include a carton conveyor onto which open cartons are placed. The carton conveyor is provided with flap-closing plows for closing the flaps at one end of the carton, as well as plows to keep open the flaps at the other end of the carton. Adjacent the carton conveyor is a product conveyor traveling at the same speed and in the same direction as the carton conveyor and having product-containing receptacles in transverse alignment with the cartons on the carton conveyor. Camming tracks engage a product pusher to move the product on the product conveyor across a transfer chute into the aligned, open carton so as to insert the product therein. Cam tracks then move the pusher across the transfer chute out across the filled carton and the open flaps on the carton are closed.

During the operation of such packaging equipment, it is sometimes desirable to prevent the product pusher from being moved toward the open carton to prevent loading of the carton because of, e.g., the carton being defective or misoriented, the carton having been misfed onto the carton conveyor or, in the case of multiple-part product, the product being incomplete. Misalignment is particularly troublesome as it can result in jamming the machine when the pusher moves to insert the product into the carton.

To overcome this problem, mechanisms, usually activated by a signal from a product detection device, are used to direct the product loaders so as to bypass the cam track that would otherwise direct a loader toward its aligned carton on the carton conveyor. Known bypass mechanisms share a common drawback that becomes particularly apparent when the cartoning apparatus is operated at high speed and the the distance between the centers of adjacent cartons on the carton conveyor is small. Under such circumstances, the time frame within which the bypass mechanism must shift becomes critical. Often, the known designs do not provide a sufficient time between consecutive cartons to shift between the product-loading position and the bypass position, and jamming results in the intersection of the bypass mechanism with the cam track.

Accordingly, it is the principal object of the present invention to provide an improved bypass mechanism for selectively loading articles into continuously conveyed cartons.

More particularly, it is an object to provide an apparatus for selectively loading articles into continuously-conveyed cartons that is less susceptible to jamming than presently-used devices and allows a maximum amount of time between consecutive cartons within which the apparatus may shift between the bypass position and the product-loading position.

These objects, and others that will become apparent upon reference to the accompanying drawings and detailed description, are provided by a device for use in packaging apparatus in which an article is carried on a first conveyor and is transferred to a second conveyor during continuous motion of the conveyors. A transfer mechanism including a cam follower means is engageable by a cam track underlying the first conveyor to actuate the transfer mechanism for effecting the transfer operation. Selective direction or bypass means engages the cam follower means to guide it to engagement with the cam track means to either effect a transfer operation or to bypass the cam track so that the transfer operation is not effected. The bypass means includes a guide track that engages the cam follower means mounted on a pivot pin on a frame member of the first conveyor adjacent to the upstream ends of both the first conveyor and the cam track. The guide track means is movable laterally with respect to the cam track means and has a quarter-circle profile so as to engage the cam follower means as the cam follower means travels about the conveyor sprocket. The guide track is automatically pivoted in response to a sensed condition on the first and second conveyor means by means of a pneumatic cylinder operatively connected to the guide track.

BRIEF DESCRIPTION OF THE DRAWINGS

FIG. 4 is an cross-sectional view of the bypass mechanism taken substantially along line 4—4 of FIG. 3; and FIG. 5 is an enlarged view taken substantially along line 5—5 of FIG. 4 showing the cam guide that forms a part of the bypass mechanism.

DETAILED DESCRIPTION OF THE PREFERRED EMBODIMENT

Figure 1:
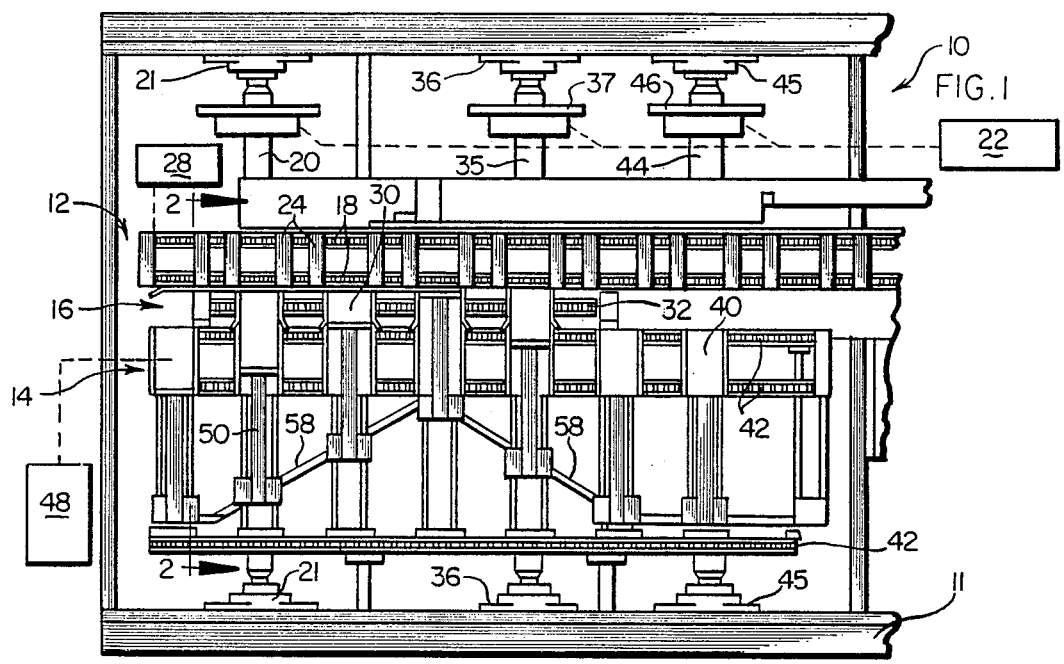
FIG. 1 is a plan view of a cartoning apparatus of the type with which the present invention may be advantageously used.
Figure 2:
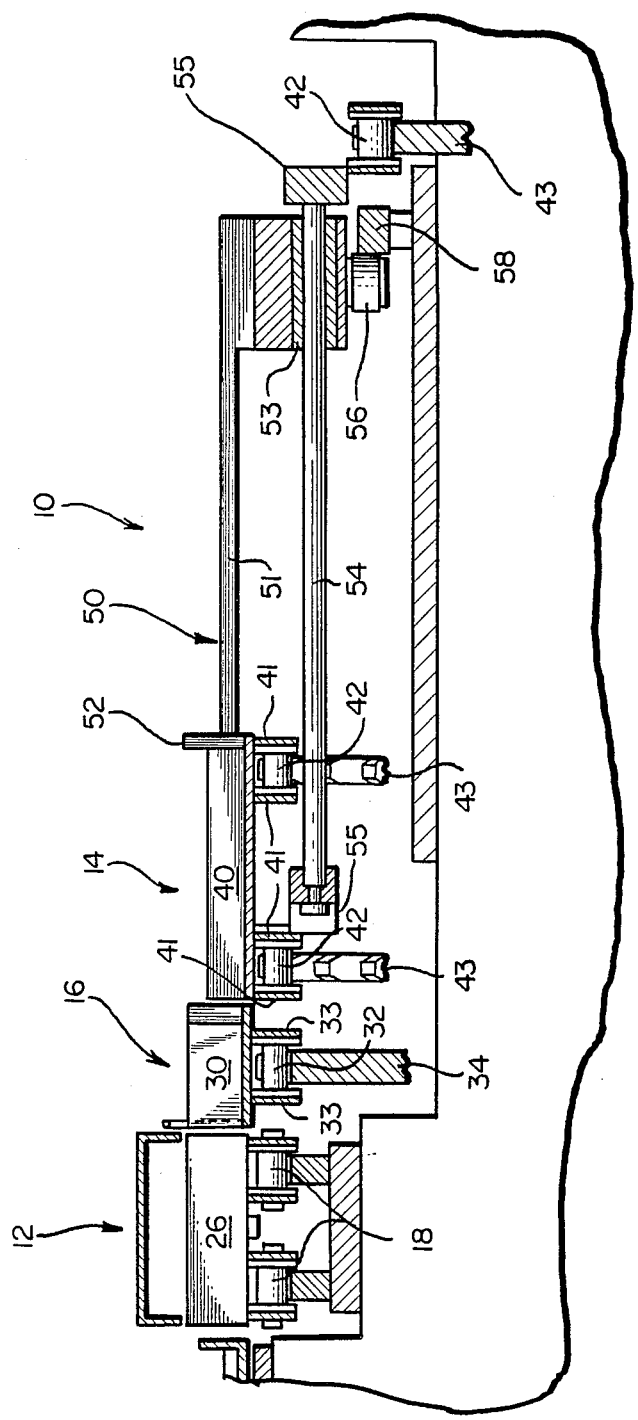
FIG. 2 is an enlarged cross-sectional view taken substantially along line 2—2 of FIG. 1 showing in greater detail the means by which articles are loaded into the cartons carried on the apparatus of FIG. 1.

Referring to the Figures of the drawings, which are by way of illustration and not limitation, there is seen a typical carton-filling apparatus, generally designated by 10 (FIG. 1) that may advantageously utilize the instant invention. The apparatus 10 is of the type described in the above-incorporated U.S. Pat. No. 3,906,705 and includes a frame 11 supporting a carton conveyor 12 arranged in parallel adjacent relationship to an article conveyor 14 and a transfer chute conveyor 16. The carton conveyor 12 includes drive chains 18 mounted on sprockets (not shown) which are, in turn, rigidly mounted to shafts 20 (one shown) rotatably supported in pillow blocks 21 (one shown). The shaft 20 is rotatably driven by a drive system, shown schematically as 22, to move the conveyor chains 18. Lugs 24 are secured to the conveyor chain 18 in spaced relation approximately equal to the width of the cartons 26 (best seen in FIG. 2) that are to be filled by the apparatus 10. The cartons 26 are supplied to the carton conveyor 12 by a transfer apparatus, indicated schematically by 28.

The transfer conveyor 16 moves transfer chutes 30 in timed relation with the cartons 26 on the carton conveyor 12. The transfer conveyor 16 includes a conveyor chain 32 to which the chutes 30 are attached by brackets 33. The chain 32 is carried on sprockets 34 (FIG. 2) rigidly mounted to shafts 20, 35. The end of the shaft 35 is rotatably mounted in pillow block 36 and a drive pulley 37 rigidly mounted to the shaft 35 is engaged by the drive system 22 to move the transfer conveyor drive chain 32.

The article conveyor 14 is moved in aligned, synchronized relation with both the transfer chutes 30 on the transfer conveyor 16 and the cartons 26 on the carton conveyor 12 to load articles into the carton 26. The article conveyor 14 includes article trays 40 mounted by brackets 41 to the conveyor chains 42, the chains 42 being carried on circular sprockets 43 fixedly mounted on shafts 20, 44, the shaft 44 being rotatably secured in pillow blocks 45. A drive pulley 46 is operatively connected to the drive system 22 to power the article conveyor 14. The article trays 40 receive articles from a loading system indicated schematically by 48.

Figure 3:
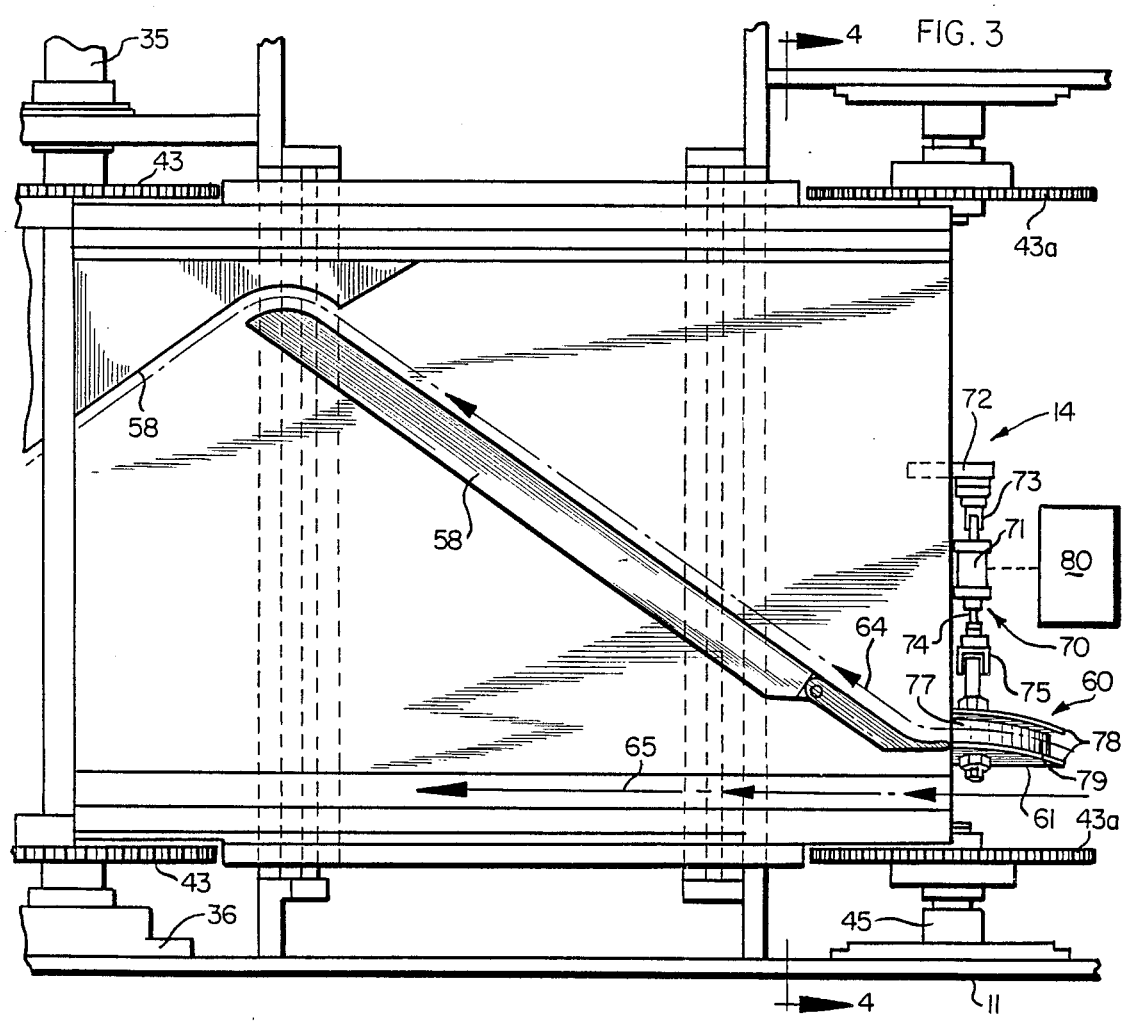
FIG. 3 is an enlarged top view of a portion of the article conveyor and product pusher shown in FIGS. 1 and 2.

An article pusher or transfer mechanism, generally indicated by 50, is associated with each tray 40 and is moved independently of the article tray 40 to push an article from the article tray 40 across its associated transfer chute 30 and into a carton 26 carried on the carton conveyor 12. To this end, each article pusher 50 is provided with an arm 51 and pusher plate 52 (best seen in FIGS. 2 and 4) mounted on bushings 53 for slidable engagement with a guide bar 54 that is fixedly mounted to the article pusher conveyor chains 42 by means of brackets 55. Each article pusher 50 is provided with a cam follower 56 that engages a cam track 58 underlying the article conveyor 14 to move the pusher 50 axially along the guide bar 54. The article pusher 50 first moves across the article tray 40 and transfer chute 30 to insert an article into an open carton 26, after which the cam track 58 contacts the cam follower 56 to retract the article pusher 50 to its initial position as shown in FIG. 3.

Summarizing the operation of the system thus far described, cartons 26 are placed between the lugs 24 on the carton conveyor 12 by the carton transfer apparatus 28. Articles to be loaded into the cartons are placed in the article trays 40 by the article loading system 48, the two aforementioned operations being performed independently. As the article and carton conveyors 14 and 12 move in aligned relationship, the conveyor 16 interposes a transfer chute 30 between the adjacent carton and article. The cam follower 56 on the article pusher contacts the cam track 58 and the pusher arm 51 is moved transversely toward the carton 26. The pusher plate 52 moves the article across the tray 40 and transfer chute 30 into the carton 26. After the article has been fully inserted into the carton 26, the cam follower 56 is moved by the cam track 58 outwardly away from the carton 26 to move the pusher arm 51 back to its original position. The loaded carton 26 is subsequently discharged from the carton conveyor 12 to a suitable transferring apparatus (not shown).

As noted above, during packaging operations occasions may arise where it is desirable to prevent an article from being loaded into its respective carton. For instance, the article itself may be defective or misaligned with its intended carton, or a carton may have been misfed to the carton conveyor. Generally, an electronic eye detects such undesired conditions and the cam followers 56 on the article pushers 50 are caused to bypass the cam track 58. Known devices have been less effective than desired when the cartoning apparatus is being operated at high speeds in that such devices are inherently unable to alternately direct an article pusher between the load and nonload sides of the cam tracks without jamming at the intersection of the bypass device and the cam track.

With reference to FIGS. 2–5, there is seen a bypass device, generally indicated by 60, in accordance with the present invention. The bypass device 60 includes a cam guide or guide track 61 pivotally secured by means of a pivot bolt 62 to a frame member 63 underlying the article conveyor 14 so as to be movable laterally between a first position (shown in FIGS. 3 and 4) which directs the cam followers 56 on the article pushers 50 along a path 64 in the cam track 58 to actuate the article pusher 50 and a second position which directs the cam followers 56 along a path 65 in which the cam track 58 is bypassed. To this end, the cam guide 61 is moved between the paths 64, 65 by actuator means, generally indicated by 70, including a pneumatic cylinder 71 pivotally mounted to a bracket 72 on the frame member 63 by means of a clevis 73. The cylinder 71 includes a piston rod 74 that is pivotally connected by a clevis 75 to bolt means 76 extending through the cam guide 61. As illustrated. The cam guide 61 includes a central portion 77 having a width slightly greater than the size of the cam followers 56, with oversized plates 78 secured on opposite sides of the central portion 77 by means of the bolt 76 so as to define a U-shaped track 79. A product/carton detection device, usually a photoelectric eye, shown schematically at 80, determines whether the product and carton 26 are properly positioned so that the cartoning action of the article pusher 50 can be successfully accomplished. The detection device 80 is operatively connected to the pneumatic cylinder 71 so as to appropriately actuate the piston rod 74 to throw the cam guide 61 into alignment with the path 64 for executing the load cycle or the path 65 for bypassing the load cycle.

In a preferred embodiment, the cam guide 61 is located at the upstream end of the article conveyor 14 (the left-hand end as viewed in FIG. 1 and the right-hand end as viewed in FIG. 3) so that it engages the cam followers 56 on the article pushers 50 as the article pushers 50 are traveling about the sprockets 43a (FIG. 3). Accordingly, the cam guide 61 has a profile of a quarter circle (as best seen in FIG. 5) having a radius of a distance sufficient to continuously engage the cam follower 56 of an article pusher 50 as it changes from moving about the sprockets 43 in a vertical direction to a horizontal direction. The length of the arc that forms the track 79 of the cam guide 61 is preferably longer than the distance between the cam followers 56 on consecutive or adjacent article pushers 50. Accordingly, more than one cam follower 56 may be in the track 79 of the cam guide 61 at any given time. The pivot bolt 62 securing the cam guide 61 to the frame member 63 is located at substantially the entry of the cam guide 79 so that, as the cam guide 61 pivots between the paths 64, 65, the entry of the guide track 79 remains in substantially the same position. Thus, a cam follower 56 can be engaged by the cam guide 61 regardless of whether the cam guide is aligned with the path 64 or 65, or even moving between the two paths. Thus, jamming of the cam followers 56 at the entry of the guide 61 is eliminated, despite the fact that the cam guide 61 can be shifted to properly direct the cam follower 56 regardless of the position of the cam follower 56 in the guide track 79.

From the foregoing, it can be seen that a selective product feed device for use with packaging equipment has been provided that fully meets the objects of the invention. While the device has been described in terms of a preferred embodiment, there is no intent to limit the invention to the same. On the contrary, it is intended to cover all modifications and equivalents within the scope of the appended claims.

What is claimed is:

1. For use in an apparatus in which an article carried on a first conveyor is transferred to a second conveyor during continuous motion of the conveyors from an upstream position to a downstream position by means of a transfer mechanism including cam follower means engageable by cam track means underlying the first conveyor to actuate the transfer mechanism for effecting the transfer operation, directing means for selectively directing the cam follower means to either engagement with the cam track means to effect a transfer operation or to bypass the cam track means so that no transfer operation is effected, comprising guide track means having a body with a generally arcuate-shaped periphery of channel-shaped cross section which defines a generally arcuate guide path having an entry end and an exit end at ends of the arcuate-shaped periphery, said body including a pivot connection for pivoting the guide track means so that the entry end is generally rotated about a point while the exit end is swung in opposed lateral directions toward and away from the cam track means so that a succession of cam follower means can enter the guide path while downstream cam follower means are laterally displaced as they travel along the arcuate guide path, for selective alignment of individual cam followers as they exit the end of the path with said cam follower means, and a pivot pin on a frame member of the first conveyor adjacent the upstream end thereof, engageable with the pivot connection of the guide track means so as to mount the guide track means for said pivoting thereof.

2. The combination of claim 1 wherein the first conveyor means includes a circular conveyor sprocket at its upstream end and the guide track means body comprises a quarter-circle section of a right circular cylinder so that the body has first and second edges generally disposed at right angles to each other and having free ends terminating at the ends of the quarter-circle arcuate periphery, said pivot connection extending along one of said first and second sides, the entry end of the guide path located adjacent the circular conveyor sprocket at the upstream end of the conveyor so as to engage the cam follower means as the cam follower means travel about the conveyor sprocket.

3. The combination of claim 2 wherein the guide track means is sized to simultaneously engage the cam follower means of at least two transfer mechanisms and the guide track means is pivotably movable in lateral directions with respect to the cam track means to selectively direct an upstream cam follower means in one lateral direction while receiving at least one downstream cam follower means and subsequently directing said one downstream cam follower means in another lateral direction.

4. The combination of claim 2 wherein the pivot pin is secured to the guide track means at the entry end thereof.

5. The combination of claim 1 wherein the guide track means includes means for automatically pivoting the guide track means in response to a sensed condition on the first and second conveyor means.

6. The combination of claim 5 wherein the automatic pivoting means includes a pneumatic cylinder operatively connected to the guide track.

* * * * *